United States Patent [19]

Wadsworth

[11] Patent Number: 4,660,377
[45] Date of Patent: Apr. 28, 1987

[54] REGENERATIVE SYSTEM FOR A GAS TURBINE

[75] Inventor: Walter Wadsworth, East Sandwich, Mass.

[73] Assignee: Fern Engineering, Inc., Bourne, Mass.

[21] Appl. No.: 703,823

[22] Filed: Feb. 21, 1985

[51] Int. Cl.[4] .............................................. F02C 7/10
[52] U.S. Cl. ............................................... 60/39.511
[58] Field of Search ............ 60/39.511, 39.512, 39.37

[56] References Cited

U.S. PATENT DOCUMENTS

| | | | |
|---|---|---|---|
| 3,201,938 | 8/1965 | Zirin | 60/39.511 |
| 3,228,190 | 1/1966 | Brown | 60/39.511 |
| 3,267,673 | 8/1966 | Hemsworth et al. | 60/39.511 |
| 3,320,749 | 5/1967 | Castle et al. | 60/39.511 |
| 4,458,481 | 7/1984 | Ernst | 60/39.511 |

FOREIGN PATENT DOCUMENTS 802166 10/1958 United Kingdom ............ 60/39.511

Primary Examiner—Louis J. Casaregola
Attorney, Agent, or Firm—Blodgett & Blodgett

[57] ABSTRACT

A system for retro-fitting a simple gas turbine to convert it to a regenerative gas turbine, the system comprising connector and inner housings associated with the combustors and connected to an air heater.

8 Claims, 6 Drawing Figures

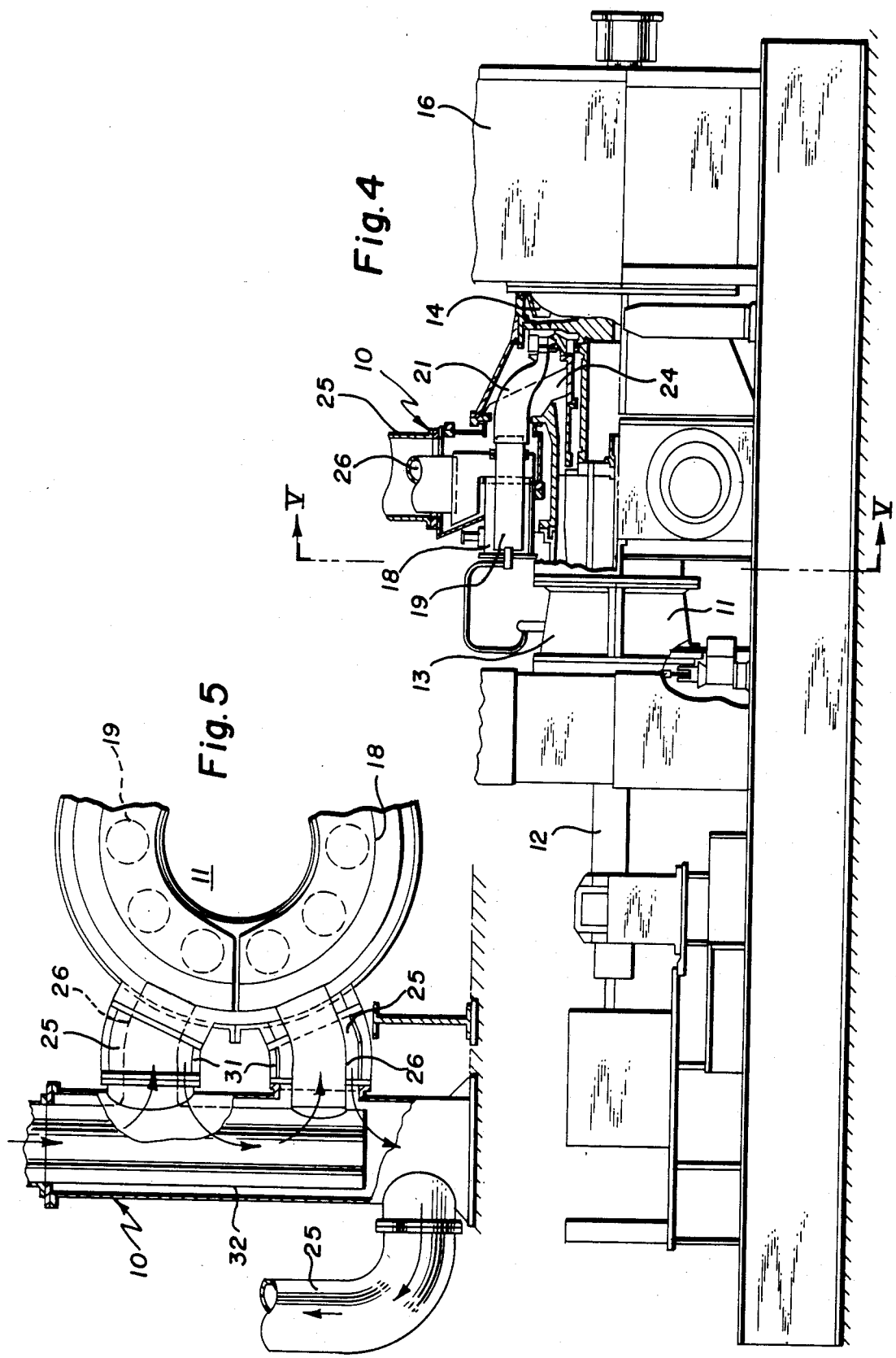

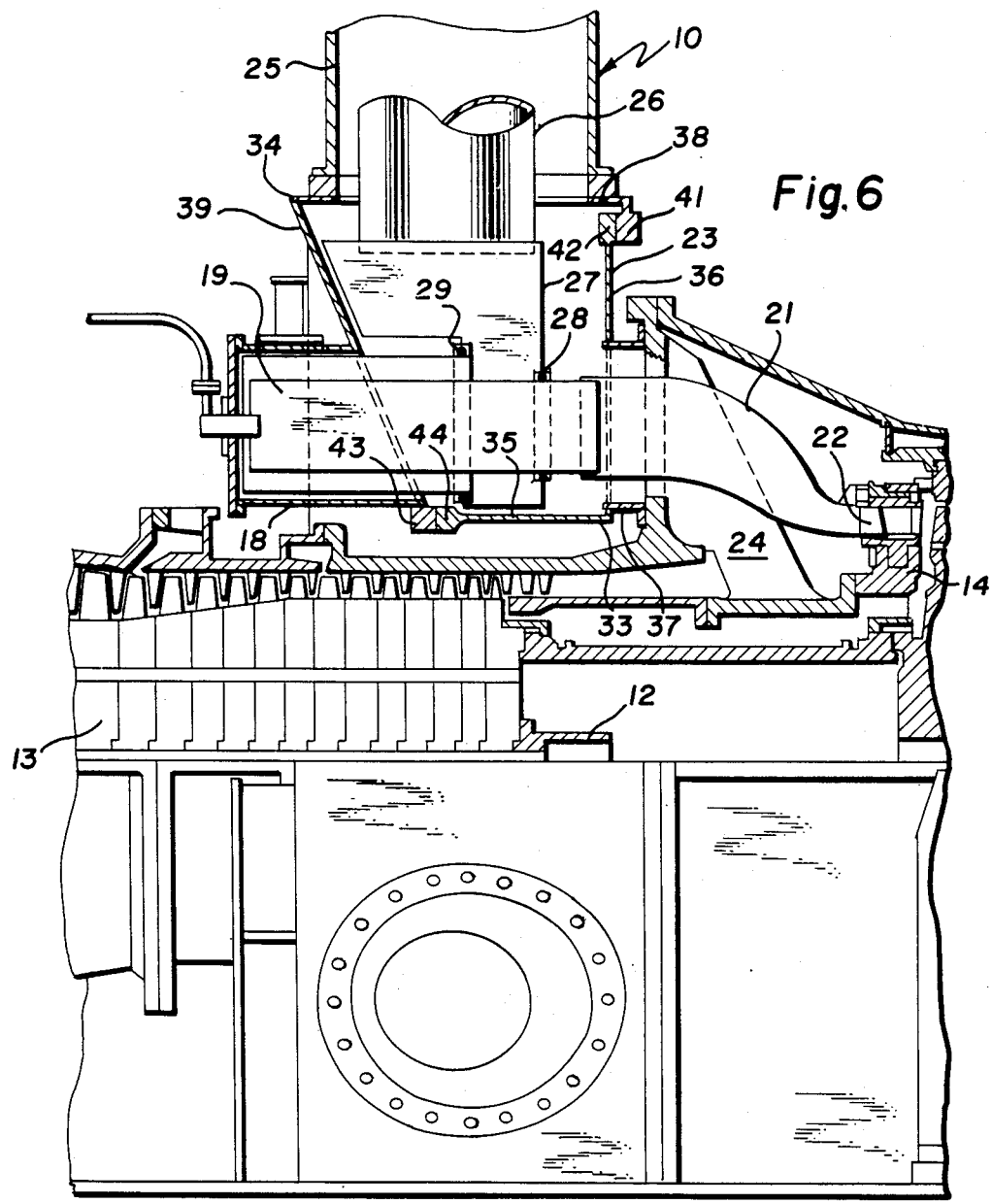

REGENERATIVE SYSTEM FOR A GAS TURBINE

BACKGROUND OF THE INVENTION

A conventional gas turbine engine consists of an air compressor, a combustor, and a turbine. Air is drawn into the engine and its pressure is increased by the compressor. The air then enters the combustor where fuel is added and burned, thus adding energy and raising the temperature of the air. This heated compressed gas flows through a turbine where energy is extracted by the turbine blades. This energy transfer spins the turbine rotor, making the energy available as power on the rotating shaft. Part of this power is used to drive the compressor, while the remainder is transferred to the output shaft where it is available to drive whatever equipment is desired. In a simple-cycle gas turbine, this process is approximately 26% efficient, since much of the energy input in the fuel is not transferred into output energy on the shaft. Some of the energy is lost to mechanical inefficiencies and friction, but the majority leaves the engine in the turbine exhaust and is lost up the stack.

It has been common practice in modern gas turbines to provide a regenerator or recuperator to capture some of the energy in the exhaust and return it to the engine. In the regenerator, which is simply a large air-to-air heat exchanger, the energy in the hot turbine exhaust gas is transferred to the compressed air before it enters the combustor. This process raises the temperature of the compressed air, so that the amount of fuel energy needed to heat the air passing through the turbine is consequently less and the resulting fuel savings make the engine a more efficient power source.

Although the above-described regenerative system is commonly used with modern gas turbines, there are literally thousands of gas turbines in existence that are operating well, but inefficiently, because they are originally not provided with such a regenerative system. Attempts to provide regenerative systems to older gas turbines have been attempted in the past, but difficulties have been encountered in providing the equipment because of the cost of doing so. In most cases, a gas turbine that was originally designed as a simple-cycle turbine does not readily lend itself to a conversion to a regenerative cycle, because of the difficulty and major redesign process required to pipe cool air to the regenerator and to return the heated air to the combustion section of the turbine. In addition, the older gas turbines sometimes have other equipment located around them that prevents the introduction of the ducting and piping required if they are to be provided with a regenerative system. These and other difficulties experienced with the prior art devices have been obviated in a novel manner by the present invention.

It is, therefore, an outstanding object of the invention to provide a regenerative system for use as a retro-fit to certain simple-cycle gas turbines.

Another object of this invention is the provision of a regenerative system for relatively inexpensively converting simple-cycle gas turbines to more efficient prime movers.

A further object of the present invention is the provision of a retro-fit regenerative system which is simple in construction, which is inexpensive to manufacture, and which is capable of a long life of useful service.

It is another object of the instant invention to provide a retro-fit system for converting a gas turbine to a regenerative system in which the cost of doing so is paid back by higher efficiency in the turbine over a short period of time.

A still further object of the invention is the provision of a retro-fit regenerative system for application to gas turbines in which the equipment can be added without affecting the structural integrity of the turbine and without major modification to existing casings and other pieces of equipment.

It is a further object of the invention to provide a retro-fit regenerative system for a gas turbine in which the down-time during installation is very short.

With these and other objects in view, as will be apparent to those skilled in the art, the invention resides in the combination of parts set forth in the specification and covered by the claims appended hereto.

SUMMARY OF THE INVENTION

In general, the invention consists of a regenerative system for retro-fit to a gas turbine of the type which has a single shaft on which are mounted a compressor section and a work section. The air heater (regenerator) is mounted adjacent the exit of the work section, so that the hot exit gas leaving the turbine enters the heater and passes around the outside of the air pasages in a counterflow direction. A plurality of combustor housings surround the compressor section, each containing a combustor mounted within it and extending coaxially thereof. Each combustor has a transition section extending to the annular entrance to the work section. An annular connector housing extends between the combustor housings and the exit of the compressor section to carry the compressed air radially. An outer duct leads from the connector housing to one end of the air heater and an inner duct is attached to the other end of the air heater. An annular inner housing lies within the connector housing. The inner duct being connected to the inner housing to deliver heated, compressed air to the combustors.

More specifically, each combustor and transition section extends through the inner housing on its way to the entrance to the work section. A seal extends around the shroud where it emerges into the connector housing and a seal extends around each combustor and the inner housing. The connector housing and the outer duct are formed of low temperature inexpensive steel.

BRIEF DESCRIPTION OF THE DRAWINGS

The character of the invention, however, may be best understood by reference to one of its structural forms, as illustrated by the accompanying drawings, in which:

FIG. 4 is a side elevational, partially sectioned, of the gas turbine installation, FIG. 5 is a cross-sectional view of the apparatus taken on the line V—V of FIG. 4, and FIG. 6 is an enlarged sectional view of portions of the gas turbine and associated regenerative system.

DESCRIPTION OF THE PREFERRED EMBODIMENT

Figure 1:
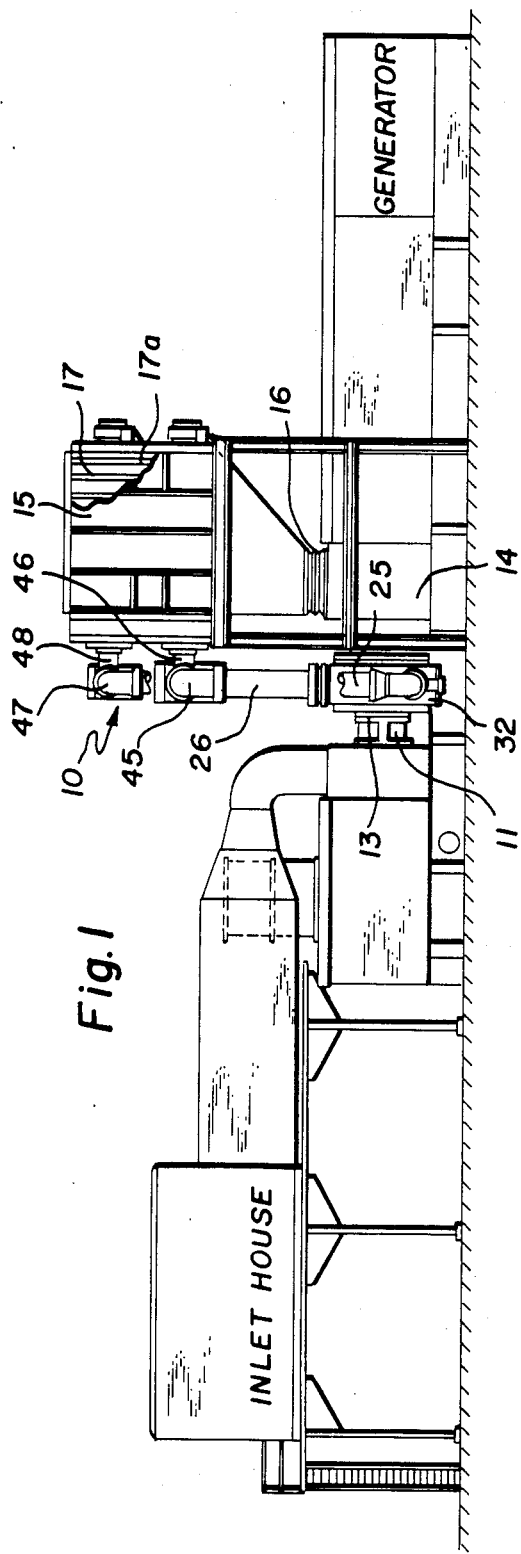
FIG. 1 is a side elevational view of a gas turbine installation incorporating the principles of the present invention.
Figure 2:
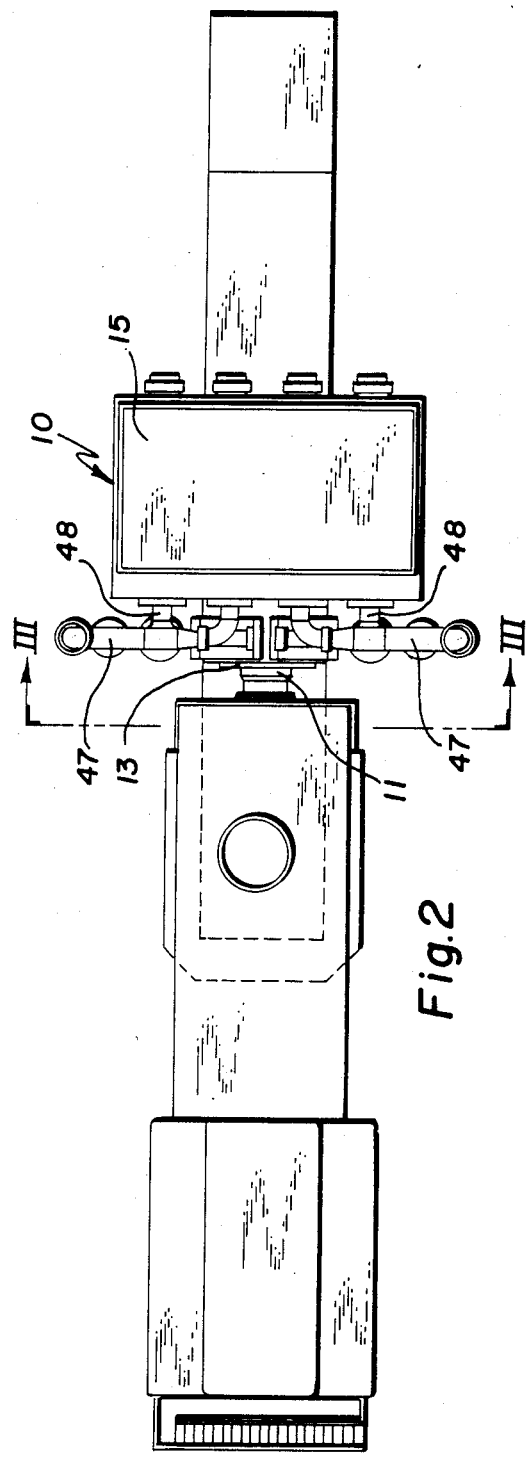
FIG. 2 is a plan view of the gas turbine installation.
Figure 3:
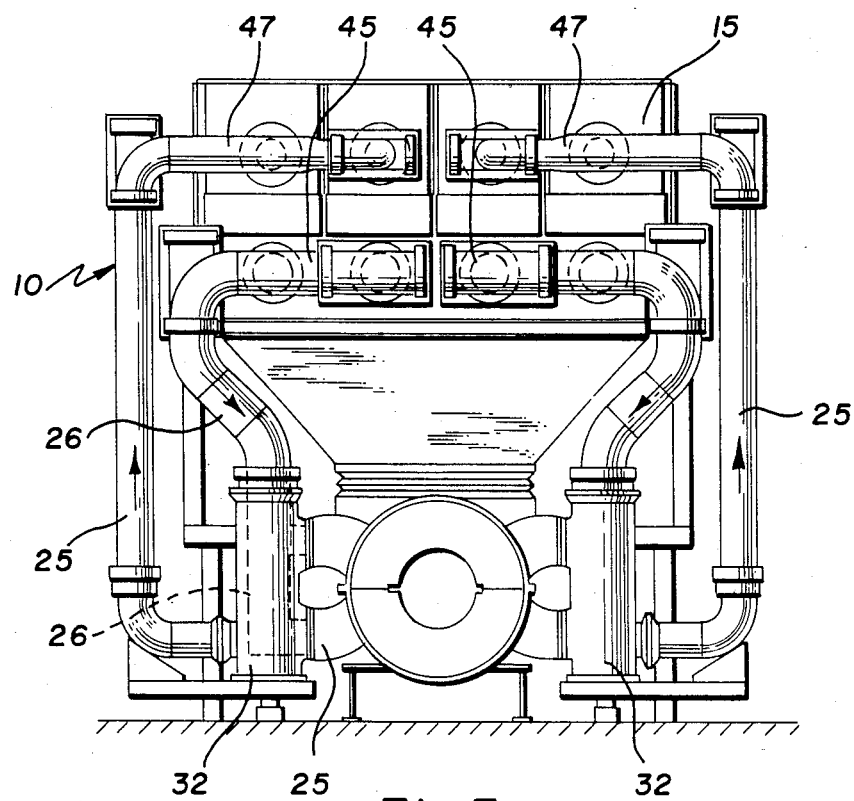
FIG. 3 is a vertical sectional view of the installation taken on the line III—III of FIG. 2.

Referring first to FIGS. 1, 2, and 3, which best show the general features of the invention, the regenerative system, indicated generally by the reference numeral 10, is shown in use with a gas turbine 11. This turbine has a single shaft 12 (FIG. 4) on which are mounted a compressor section 13 and a work section 14. A tubular air heater 15 is mounted adjacent the exit of the work section 14, so that the hot exit gas can pass from the exit 16 directly to the air heater 15 which has heat exchanges 17 and 17a.

Referring to FIGS. 4, 5, and 6, it can be seen that a plurality of combustor housings 18 are provided, each surrounding a combustor 19 mounted within it and extending coaxially thereof. Each combustor has a transition section 21 which extends to the annular entrance 22 of the work section 14 of the turbine.

An annular connector housing 23 extends between the combustor housings 18 and the exit 24 of the compressor section 13 to carry compressed air radially. An outer duct 25 leads from the connector housing 23 to one end of the air heater 15, while the other end of the air heater 15 is attached to an inner duct 26 which passes into the connector housing. An annular inner housing 27 lies within the connector housing 23 and the inner duct 26 is connected to this inner housing to deliver compressed air to the combustors 19.

As is evident in FIG. 6, each combustor 19 and its transition section 21 extends through the inner housing 27 on its way to the entrance 22 of the work section 14 of the turbine and a seal 28 extends around the combustor housing where it emerges into the connector housing 23. A seal 29 extends between the combustor housing and another portion of the inner housing 27. The connector housing 23 and the outer duct 25 are formed of low-temperature inexpensive steel sheet or plate. I0 The inner duct 26 and the outer duct 25 extend radially away from the connector housing 23 to an air header 32 at which location the outer duct 25 branches away from the inner duct on its way to the said one end of the air heater, while the inner duct 26 continues on its path to the said other end of the air heater.

As is evident in FIG. 1, the air heater 15 is located above the work section 14 of the turbine with its gas passages 17 extending vertically. The outer duct 25 is connected to the upper end of the air heater and the inner duct 26 is connected to the lower end. The regenerator or heater 15 is the primary piece of equipment needed to recover the heat from the exhaust gases. This large gas-to-air heat exchanger consists of a large number of the gas passages 17 and air passages 17a contained in a casing and the hot exhaust gases pass vertically upwardly through the casing and flow over the outside of the air passages 17a. The cooler compressed air is made to pass vertically downwardly through the air passages 17a and the energy in the exhaust gases is transferred through the passage walls and serves to heat the compressed air in a conventional counterflow arrangement. The heated, compressed air then returns to the combustor where fuel is added and the remainder of the required temperature rise is accomplished. Since the air has been preheated, less fuel is required.

As can be seen in FIG. 5, a pair 31 of inner and outer ducts 25, 26 extend from each side of the connector housing 23. Each pair 31 is connected to an upwardly-extending air header 32. Each of the ducts of each said pair 31 is slightly curved, so that the inner ends of the concentric ducts connect radially to the connector housing 23 and the outer ends connect at right angles to the vertical headers 32.

The connector housing 23 (referring to FIG. 6) consists of an inner part 33 and an outer part 34. The inner part 33 consists of a tubular wall 35 extending coaxially of the turbine shaft 12 and an integral radial wall 36. The wall has an integral pipe 37 located coaxially of each combustor and adapted to be fastened to the exit 24 of the compressor section 13 of the turbine. The outer part 34 of the connector housing 23 has a tubular wall 38 which is coaxial of the turbine shaft 12 as well as coaxial of the tubular wall 35 of the inner part 33. The outer duct 25 is connected to this tubular wall 38. The outer part 34 also has an integral conical wall 39 which extends inwardly from the outer tubular wall 38 to the inner tubular wall 35 of the inner part.

The free edge of the tubular wall 38 of the outer part 34, is adapted to be removably fastened to the outer edge of the radial wall 36 of the inner part 33. In addition, the free edge of the conical wall 39 of the outer part 34 is adapted to be removably fastened to the free edge of the tubular wall 35 of the inner part 33. These matching edges are provided with flanges or enlargements to assist in fastening them together; this arrangement consists of an enlargement 41 associated with the free edge of the tubular wall 38, an enlargement 42 associated with the outer edge of the radial wall 36, an enlargement 43 associated with the inner edge of the conical wall 39, and an enlargement 44 associated with the free edge of the tubular wall 35.

As shown in FIG. 1, the outer ducts 25 lead up to a cross-header duct 47 from which a plurality of ducts 48 lead horizontally to the upper end of the air heater 15 to deliver cold compressed air. The inner ducts 26 similarly lead up to a cross-header duct 45 from which a plurality of horizontal ducts 46 lead to the lower end of the air heater to receive heated compressed air.

The operation and advantages of the present invention will now be readily understood in view of the above discussion. As can be seen in FIG. 1, the air enters the system through an inlet house and passes through silencers on its way to the compressor section 13 of the turbine 11. As can be seen in FIG. 4, the air passes through the compressor section 13, is compressed, and leaves at the exit 24. Referring to FIG. 6, the cold compressed air passes from the exit 24 around the transition section 21. It passes through the space between the transition section and the pipe 37 associated with the radial wall 36 on the inner portion 33 of the connector housing 23 and the air then flows into the duct 25. As has been indicated (and referring to FIG. 5), this means that there are four large outer ducts 25, two of which lead to one vertical header 32 and two to the vertical header 32 on the other side of the turbine. The cold compressed air thus passes into the cross-header 47 and through the horizontal ducts 48. It arrives at the top of the gas passages 17a of the air heater 15 and passes downwardly through those passages. As they pass through the inside of the passages, they are in heat exchange relationship to the hot exhaust gases which heat the air; the air leaves the bottom end of the passages and passes horizontally through the ducts 46 to the cross-header 45. The heated compressed air then passes downwardly through the ducting 26, then passes through the annular wall 38 of the connector housing into the interior inner housing 27. This housing is connected to the combustor housing 18 and, therefore, has access to the air openings of the combustor 19. Fuel is introduced at the left hand end of the combustor 19, so that combustion takes place and the hot gases thus generated pass axially along the combustor through the transition section 21 into the entrance 22 of the work section 14 of the turbine. When the hot gas has given up its energy to the work section of the turbine, the gas passes upwardly through the exit 16 into the air heater 15 and passes upwardly within the casing through the passages 17 and then passes upwardly to the stack (not shown). Therefore, it can be seen that the air has been preheated, so that less fuel is required to give gases at a temperature commensurate with the requirements of the work section 14 of the turbine.

Without the air heater or regenerator, the air passes directly from the compressor into the combustor completely inside the engine case. When a regenerator is added, it is necessary for the compressed air to be taken from the engine case, piped to the regenerator, and returned to the engine case. The unique plenum system of the present invention allows the air extraction and reinjection to be accomplished quite easily and it requires no modification to the existing casings or structure of the old turbines. Only a few combustion parts require replacement. The resulting fuel savings which may be as much as 15% to 30%, costing with present day prices as much as $3,000,000 per year, can repay the investment in the retro-fit regenerative within a short period of time. It would appear that the capital investment can be recovered in as little as one to three years. Because of the nature of the present invention, the turbine would be out of service only during the installation phase of the project and this would be a relatively short period of time. Nevertheless, the equipment is simple and rugged and would be capable of a long life of useful service with a minimum of maintenance. One of the outstanding advantages is that the construction, particularly of the connector housing 23, the outer air header 32, and the air pipes 25 can be of inexpensive steel which does not require high temperature specification. This is because these elements are subjected only to the cold compressed air. Furthermore, any leakage that takes place through this outer casing is compressed air rather than hot gases and this serves to obviate any safety or pollution problem.

In addition to the advantages set forth above, it is clear that other advantages result from the invention. For instance, no modifications are required to the existing gas turbine casing and the basic support structure of the gas turbine is not affected. When the regenerator is located above the turbine, no additional real estate is required; this could be important for existing sites that have closely-arranged multiple turbine-generator units or where other station equipment is located nearby. The invention permits a relatively simple turbine modification from simple-cycle to regenerative cycle and the unit can be re-converted back to simple-cycle if there is ever a need. There will be a relatively small increase in maintenance cost and no change in operating procedures. Also, the turbine modification can take place in a very short period of time, so that the turbine will be out of operation for only a short period.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Regenerative system for a gas turbine, wherein the turbine has a single shaft on which are mounted a compressor section and a work section, comprising:
    (a) an air heater mounted adjacent the exit of the work section, the hot exit gas and pressurized air passing through passages formed in the air heater,
    (b) a plurality of combustor housings surrounding the compressor section, each containing a combustor mounted within it and extending coaxially thereof, each combustor having a transition section extending to the entrance to the work section,
    (c) an annular connector housing extending between the combustor housing and the exit of the compressor section to carry the compressed air radially,
    (d) an outer duct leading from the connector housing to one end of the air heater,
    (e) an inner duct attached to the other end of the air heater, and
    (f) an annular inner housing lying within the connector housing, the inner duct being connected to the said inner housing to deliver heated compressed air to the combustor housing, wherein each combustor extends through the inner housing on its way to the entrance to the work section, a seal extends around the combustor where it emerges into the connector housing, and a seal extends between each combustor housing and the inner housing, the connector housing and the outer duct being formed of low temperature steel.

2. Regenerative system as recited in claim 1, wherein the inner and outer ducts extend radially away from the connector housing to a location at which the outer duct branches away from inner duct on its path to the said one end of the air heater, while the inner duct continues on its path to the said other end of the air heater.

3. Regenerative system as recited in claim 2, wherein the air heater is located above the work section with the said passages extending vertically, wherein the outer duct is connected to the upper end of the air heater and the inner duct is connected to the lower end.

4. Regenerative system as recited in claim 3, wherein a pair of inner and outer ducts extend from each side of the connector housing, each pair being connected to coaxial vertical ducts extending upwardly, each of the said pair being slightly curved, so that the inner ends connect radially to the connector housing and connect at right angles to the vertical ducts.

5. Regenerative system as recited in claim 4, wherein the outer ducts lead up to a cross-header duct from which a plurality of ducts lead horizontally to the upper end of the air heater to deliver cold air, and the inner ducts similarly lead up to a cross-header duct from which a plurality of horizontal ducts lead to the lower end of the air heater to receive heated air.

6. Regenerative system for a gas turbine, wherein the turbine has a single shaft on which are mounted a compressor section and a work section, comprising:
    (a) an air heater mounted adjacent the exit of the work section, the hot exit gas and pressurized air passing through passages formed in the air heater,
    (b) a plurality of combustor housings surrounding the compressor section, each containing a combustor mounted within it and extending coaxially thereof, each combustor having a transition section extending to the entrance to the work section,
(c) an annular connector housing extending between the combustor housing and the exit of the compressor section to carry the compressed air radially,
(d) an outer duct leading from the connector housing to one end of the air heater,
(e) an inner duct attached to the other end of the air heater, and
(f) an annular inner housing lying within the connector housing, the inner duct being connected to the said inner housing to deliver heated compressed air to the combustor housing, wherein the connector housing consists of inner and outer parts, the inner part consisting of a tubular wall extending coaxially of the turbine shaft and an integral radial wall, the radial wall having an integral pipe located coaxially of each combustor and adapted to be fastened to the exit of the compressor section.

7. Regenerative system as recited in claim 6, wherein the outer part of the connector housing has a tubular wall which is coaxial of the turbine shaft and to which the outer duct is attached and an integral conical wall extending inwardly to the tubular wall of the inner part.

8. Regenerative system as recited in claim 7, wherein the free edge of the tubular wall of the outer part is adapted to be removably fastened to the outer edge of the radial wall of the inner part, and wherein the free edge of the conical wall of the outer part is adapted to be removably fastened to the free edge of the tubular wall of the inner part.

* * * * *